(12) United States Patent
Shi et al.

(10) Patent No.: US 10,264,501 B2
(45) Date of Patent: Apr. 16, 2019

(54) BEARER HANDOVER CONTROL DEVICE AND CONTROL METHOD

(71) Applicant: Huawei Technologies Co., Ltd., Shenzhen (CN)

(72) Inventors: Xiaoyan Shi, Beijing (CN); Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 117 days.

(21) Appl. No.: 15/376,214

(22) Filed: Dec. 12, 2016

(65) Prior Publication Data
US 2017/0195933 A1    Jul. 6, 2017

Related U.S. Application Data

(63) Continuation of application No. PCT/CN2014/079769, filed on Jun. 12, 2014.

(51) Int. Cl.
*H04W 36/28* (2009.01)
*H04W 36/38* (2009.01)

(52) U.S. Cl.
CPC .......... *H04W 36/28* (2013.01); *H04W 36/38* (2013.01)

(58) Field of Classification Search
None
See application file for complete search history.

(56) References Cited

U.S. PATENT DOCUMENTS

| | | | |
|---|---|---|---|
| 2010/0111041 A1* | 5/2010 | Lim | H04W 36/02 370/331 |
| 2012/0147856 A1 | 6/2012 | Kazmi et al. | |

(Continued)

FOREIGN PATENT DOCUMENTS

| | | |
|---|---|---|
| CN | 101651977 A | 2/2010 |
| CN | 102612163 A | 7/2012 |

(Continued)

OTHER PUBLICATIONS

"SeNB change and inter-MeNB handover procedure," 3GPP TSG-RAN WG3 Meeting #83, Prague, Czech Republic, R3-140424, 3rd Generation Partnership Project, Valbonne, France (Feb. 10-14, 2014).

(Continued)

*Primary Examiner* — Duc T Duong
(74) *Attorney, Agent, or Firm* — Leydig, Voit & Mayer, Ltd.

(57) ABSTRACT

Embodiments of the present invention disclose a bearer handover control device and control method. The method includes: receiving, by a network side device, a bearer handover message; and determining, by the network side device according to the bearer handover message, a bearer needing to be handed over in all bearers, so that an end marker End Marker message is sent to a source base station only for the bearer needing to be handed over. By using the foregoing solutions, for a multi-connection scenario, a network side device can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

5 Claims, 7 Drawing Sheets

(56) References Cited

U.S. PATENT DOCUMENTS

| | | | | |
|---|---|---|---|---|
| 2012/0294277 A1* | 11/2012 | Jaiswal | ............... | H04W 36/023 370/331 |
| 2013/0084867 A1* | 4/2013 | Sirotkin | ............... | H04W 52/04 455/436 |
| 2013/0170435 A1* | 7/2013 | Dinan | ............... | H04L 45/50 370/328 |
| 2014/0092866 A1* | 4/2014 | Teyeb | ............... | H04W 36/24 370/331 |
| 2015/0038145 A1* | 2/2015 | Nakata | ............... | H04W 36/0055 455/436 |
| 2016/0294686 A1* | 10/2016 | Hu | ............... | H04L 12/6418 |
| 2017/0126618 A1* | 5/2017 | Bhaskaran | ............... | H04L 61/2007 |
| 2017/0245184 A1* | 8/2017 | Nagesh Shetigar | ..... | H04J 11/00 |
| 2017/0257802 A1* | 9/2017 | Roeland | ............ | H04W 36/0033 |
| 2017/0289855 A1* | 10/2017 | Xu | ............... | H04W 36/0016 |
| 2017/0374542 A1* | 12/2017 | Ryu | ............... | H04W 8/08 |
| 2018/0097733 A1* | 4/2018 | Harari | ............... | H04L 45/586 |

FOREIGN PATENT DOCUMENTS

| | | |
|---|---|---|
| CN | 103517357 A | 1/2014 |
| CN | 103546928 A | 1/2014 |
| RU | 2504083 C2 | 1/2014 |
| WO | WO 9859468 A2 | 12/1998 |
| WO | WO 2014056130 A1 | 4/2014 |

OTHER PUBLICATIONS

"Introduction of Dual Connectivity (RAN3 topics)," 3GPP TSG-RAN WG3 #84, Seoul, South Korea, R3-141480, 3$^{rd}$ Generation Partnership Project, Valbonne, France (May 19-23, 2014).

"Introduction of Dual Connectivity Operation," SA WG2 Meeting #103, Phoenix, Arizona, S2-142259, 3$^{rd}$ Generation Partnership Project, Valbonne, France (May 19-23, 2014).

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," V12.4.0, pp. 1-302, 3$^{rd}$ Generation Partnership Project, Valbonne, France (Mar. 2014).

"3$^{rd}$ Generation Partnership Project; Technical Specification Group Core Network and Terminals; Non-Access-Stratum (NAS) protocol for Evolved Packet System (EPS); Stage 3 (Release 12)," V12.4.0, pp. 1-362, 3$^{rd}$ Generation Partnership Project, Valbonne, France (Mar. 2014).

"3$^{rd}$ Generation Partnership Project; Technical Specification Group Core Network and Terminals; Restoration procedures (Release 12)," 3GPP TS 23.007, V12.4.0, pp. 1-85, 3$^{rd}$ Generation Partnership Project, Valbonne, France (Mar. 2014).

"3$^{rd}$ Generation Partnership Project; Technical Specification Group Core Network and Terminals; 3GPP Evolved Packet System (EPS); Evolved General Packet Radio Service (GPRS) Tunnelling protocol for Control plane (GTPv2-C); Stage 3 (Release 12)," 3GPP TS 29.274, V12.4.0, pp. 1-245, 3$^{rd}$ Generation Partnership Project, Valbonne, France (Mar. 2014).

"3$^{rd}$ Generation Partnership Project; Technical Specification Group Core Network and Terminals; General Packet Radio System (GPRS) Tunnelling Protocol User Plane (GTPv1-U) (Release 11)," 3GPP TS 29.281, V11. 6.0, pp. 1-27, 3$^{rd}$ Generation Partnership Project, Valbonne, France (Mar. 2013).

\* cited by examiner

BEARER HANDOVER CONTROL DEVICE AND CONTROL METHOD

CROSS-REFERENCE TO RELATED APPLICATIONS

This application is a continuation of International Patent Application No. PCT/CN2014/079769 filed on Jun. 12, 2014, the disclosure of which is hereby incorporated by reference in its entirety.

TECHNICAL FIELD

Embodiments of the present invention relate to the communications field, and in particular, to a bearer handover control device and control method.

BACKGROUND

A wireless network architecture of a current evolved packet system (EPS) is shown in FIG. 1, in which functions of main network entities are as follows:

An evolved universal terrestrial radio access network (E-UTRAN) is a network including a plurality of base stations (Evolved Node B, eNodeB, or eNB), and implements a wireless physical layer function, and functions of resource scheduling and wireless resource management, wireless access control, and mobility management. An eNodeB is connected to an S-GW by using a user plane interface S1-U, to transfer user data, and is connected to an MME by using a control plane interface S1-MME, to implement functions, such as radio access bearer control, by using the S1-AP protocol.

The mobility management entity (MME) is mainly responsible for all control plane functions of user session management, which include non-access-stratum (NAS) signaling and security management, tracking area list management, selection of a P-GW and an S-GW, and the like.

The serving gateway (S-GW or SGW) is mainly responsible for data transmission, data forwarding, and route switching of user equipment (UE), and serves as a local mobility anchor point when the user equipment is handed over between eNodeBs. For each user equipment, only one S-GW serves the user equipment at each moment.

A PDN gateway P-GW, or PGW) serves as an anchor point for connecting to a packet data network (PDN), and is responsible for allocation of an IP address to the user equipment, filtration of a data packet for the user equipment, rate control, charging information generation, and the like.

The user equipment accesses the EPS network and establishes a PDN connection by using an attach procedure. In this process, the PGW allocates a PDN address to the user equipment, and the user equipment is connected to the PGW by using the PDN address and implements data transmission with an external network by using the PGW. After the attach procedure ends, the UE may apply for an extra PDN connection to obtain an extra PDN address, and a specific procedure is similar to the attach procedure.

In order to solve a bottleneck problem in air interface transmission, it is expected by people that a dual connectivity feature can be used by the UE, so as to increase a rate of transmission between the UE and a base station. That is, the UE is connected to two eNBs at the same time, and a plurality of bearers is transmitted on the different eNBs. However, in a conventional bearer process, there is no special control on dual connectivity. When a first eNB transfers some bearers of the UE to a second eNB, because a corresponding network side device does not know a dual connectivity process thereof, a conventional manner for processing a single-connection bearer is still used. Obviously, such a manner for processing a single connection cannot satisfy a dual-connectivity processing requirement when it is applied to dual-connectivity bearers, thereby leading to communication abnormality.

SUMMARY

In view of this, embodiments of the present invention provide a bearer handover control device and control method, which can solve a problem of a bearer loss in a multi-connection scenario.

An embodiment of the present invention provides a network side device, configured to control a bearer handover, where the network side device belongs to a wireless communications system, where the system further includes a source base station and a target base station, and at least some of all bearers between user equipment and the source base station need to be handed over from the source base station to the target base station, and the network side device includes: a receiving unit, configured to receive a bearer handover message; and a processing unit, configured to determine, according to the bearer handover message, a bearer needing to be handed over in all the bearers, so that an end marker End Marker message is sent to the source base station only for the bearer needing to be handed over.

Optionally, the network side device is a serving gateway SGW, where the receiving unit configured to receive a bearer handover message includes: a receiving unit of the SGW, configured to receive at least one bearer modification request message sent by a mobility management entity MME, where bearer contexts included in the at least one bearer modification request message correspond to all the bearers; the processing unit configured to determine, according to the bearer handover message, a bearer needing to be handed over in all the bearers, so that an end marker End Marker message is sent to the source base station only for the bearer needing to be handed over includes: a processing unit of the SGW, configured to determine, according to the bearer contexts in the at least one bearer modification request message, the bearer needing to be handed over; and the SGW further includes a sending unit, configured to send the End Marker message to the source base station only for the bearer needing to be handed over.

Optionally, the processing unit of the SGW configured to determine, according to the bearer contexts in the at least one bearer modification request message, the bearer needing to be handed over includes: being configured to match fully qualified tunnel endpoint identifiers (Fully Qualified Tunnel End Point Identifier, F-TEID) in the bearer contexts in the at least one bearer modification request message with F-TEIDs in bearer contexts that are currently stored by the SGW, and when an F-TEID of a bearer is changed, determine that the bearer is a bearer needing to be handed over; or being configured to match base station addresses in the bearer contexts in the at least one bearer modification request message with base station addresses in bearer contexts that are currently stored by the SGW, and when a base station address of a bearer is changed, determine that the bearer is a bearer needing to be handed over.

Optionally, the network side device is a serving gateway SGW, where the receiving unit configured to receive a bearer handover message includes: a receiving unit of the SGW, configured to receive at least one bearer modification request message sent by a mobility management entity MME, where the bearer modification request message includes first indication information, and the first indication information indicates the bearer needing to be handed over; the processing unit configured to determine, according to the bearer handover message, a bearer needing to be handed over in all the bearers, so that an end marker End Marker message is sent to the source base station only for the bearer needing to be handed over includes: a processing unit of the SGW, configured to determine, according to the first indication information in the at least one bearer modification request message, the bearer needing to be handed over; and the SGW further includes a sending unit, configured to send the End Marker message to the source base station only for the bearer needing to be handed over.

Optionally, each bearer modification request message of the at least one bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of indication information indicates whether a corresponding bearer needs to be handed over.

Optionally, the processing unit of the SGW is further configured to reserve a context of a bearer that does not need to be handed over.

Optionally, the network side device is a mobility management entity MME, where the receiving unit configured to receive a bearer handover message includes: a receiving unit of the MME, configured to receive an evolved universal terrestrial radio access network radio access bearer E-RAB modification indication message sent by the source base station, where bearer contexts included in the E-RAB modification indication message correspond to all the bearers; the processing unit configured to determine, according to the bearer handover message, a bearer needing to be handed over in all the bearers, so that an end marker End Marker message is sent to the source base station only for the bearer needing to be handed over includes: a processing unit of the MME, configured to determine, according to the bearer contexts in the E-RAB modification indication message, the bearer needing to be handed over; and the MME further includes a sending unit, configured to send a bearer modification request message to an SGW, where a bearer context carried in the bearer modification request message includes only a bearer context of the bearer needing to be handed over.

Optionally, the processing unit of the MME configured to determine, according to the bearer contexts in the E-RAB modification indication message, the bearer needing to be handed over includes: being configured to match F-TEIDs in bearer contexts of all bearers in the E-RAB modification indication message with F-TEIDs of currently stored bearer contexts, and when an F-TEID of a bearer is changed, determine that the bearer is a bearer needing to be handed over; or being configured to match base station addresses in bearer contexts of all bearers in the E-RAB modification indication message with base station addresses in bearer contexts that are currently stored by the MME, and when a base station address of a bearer is changed, determine that the bearer is a bearer needing to be handed over.

Optionally, the network side device is a mobility management entity MME, where the receiving unit configured to receive a bearer handover message includes: a receiving unit of the MME, configured to receive an E-RAB modification indication message sent by the source base station, where the E-RAB modification indication message includes second indication information, and the second indication information indicates the bearer needing to be handed over; the processing unit configured to determine, according to the bearer handover message, a bearer needing to be handed over in all the bearers, so that an end marker End Marker message is sent to the source base station only for the bearer needing to be handed over includes: a processing unit of the MME, configured to determine, according to the second indication information in the E-RAB modification indication message, the bearer needing to be handed over; and the MME further includes a sending unit, configured to send at least one bearer modification request message to an SGW, where a bearer context carried in the at least one bearer modification request message includes only a context of the bearer needing to be handed over; or the at least one bearer modification request message includes first indication information, and the first indication information indicates the bearer needing to be handed over.

Optionally, the E-RAB modification indication message includes one piece of second indication information, where the second indication information indicates all bearers in the E-RAB modification indication message are bearers needing to be handed over; or the E-RAB modification indication message includes a plurality of pieces of second indication information, where each bearer in the E-RAB modification indication message corresponds to one piece of second indication information, and each piece of indication information indicates whether a corresponding bearer needs to handed over.

Optionally, each bearer modification request message of the at least one bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of indication information indicates whether a corresponding bearer needs to be handed over.

An embodiment of the present invention provides a bearer handover control method. The method is applicable to a wireless communications system, where the system includes a network side device, a source base station, and a target base station, and at least some of all bearers between user equipment and the source base station need to be handed over from the source base station to the target base station, and the method includes following steps: receiving, by the network side device, a bearer handover message; and determining, by the network side device according to the bearer handover message, a bearer needing to be handed over in all the bearers, so that an end marker End Marker message is sent to the source base station only for the bearer needing to be handed over.

Optionally, the network side device is a serving gateway SGW, where the receiving, by the network side device, a bearer handover message includes: receiving, by the SGW, at least one bearer modification request message sent by a mobility management entity MME, where bearer contexts included in the at least one bearer modification request message correspond to all the bearers; and the determining, by the network side device according to the bearer handover message, a bearer needing to be handed over in all the bearers, so that an end marker End Marker message is sent to the source base station only for the bearer needing to be handed over includes: determining, by the SGW according to the bearer contexts in the at least one bearer modification request message, the bearer needing to be handed over; and sending, by the SGW, the End Marker message to the source base station only for the bearer needing to be handed over.

Optionally, the determining, by the SGW according to the bearer contexts in the at least one bearer modification request message, the bearer needing to be handed over includes: matching, by the SGW, F-TEIDs in the bearer contexts in the at least one bearer modification request message with F-TEIDs in bearer contexts that are currently stored by the SGW, and when an F-TEID of a bearer is changed, determining that the bearer is a bearer needing to be handed over; or matching, by the SGW, base station addresses in the bearer contexts in the at least one bearer modification request message with base station addresses in bearer contexts that are currently stored by the SGW, and when a base station address of a bearer is changed, determining that the bearer is a bearer needing to be handed over.

Optionally, the network side device is a serving gateway SGW, where the receiving, by the network side device, a bearer handover message includes: receiving, by the SGW, at least one bearer modification request message sent by a mobility management entity MME, where the bearer modification request message includes first indication information, and the first indication information indicates the bearer needing to be handed over; and the determining, by the network side device according to the bearer handover message, a bearer needing to be handed over in all the bearers, so that an end marker End Marker message is sent to the source base station only for the bearer needing to be handed over includes: determining, by the SGW according to the first indication information in the at least one bearer modification request message, the bearer needing to be handed over; and sending, by the SGW, the End Marker message to the source base station only for the bearer needing to be handed over.

Optionally, each bearer modification request message of the at least one bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of first indication information indicates whether a corresponding bearer needs to be handed over.

Optionally, the control method further includes: reserving, by the SGW, a context of a bearer that does not need to be handed over.

Optionally, the network side device is a mobility management entity MME, where the receiving, by the network side device, a bearer handover message includes: receiving, by the MME, an evolved universal terrestrial radio access network radio access bearer E-RAB modification indication message sent by the source base station, where bearer contexts included in the E-RAB modification indication message correspond to all the bearers; and the determining, by the network side device according to the bearer handover message, a bearer needing to be handed over in all the bearers, so that an end marker End Marker message is sent to the source base station only for the bearer needing to be handed over includes: determining, by the MME according to the bearer contexts in the E-RAB modification indication message, the bearer needing to be handed over; and sending, by the MME, a bearer modification request message to an SGW, where a bearer context carried in the bearer modification request message includes only a context of the bearer needing to be handed over.

Optionally, the determining, by the MME according to the bearer contexts in the E-RAB modification indication message, the bearer needing to be handed over includes: matching, by the MME, F-TEIDs in bearer contexts of all bearers in the E-RAB modification indication message with F-TEIDs of currently stored bearer contexts, and when an F-TEID of a bearer is changed, determining that the bearer is a bearer needing to be handed over; or matching, by the MME, target base station addresses in bearer contexts of all bearers in the E-RAB modification indication message with base station addresses in bearer contexts that are currently stored by the MME, and when a base station address of a bearer is changed, determining that the bearer is a bearer needing to be handed over.

Optionally, the network side device is a mobility management entity MME, where the receiving, by the network side device, a bearer handover message includes: receiving, by the MME, an E-RAB modification indication message sent by the source base station, where the E-RAB modification indication message includes second indication information, and the second indication information indicates the bearer needing to be handed over; and the determining, by the network side device according to the bearer handover message, a bearer needing to be handed over in all the bearers, so that an end marker End Marker message is sent to the source base station only for the bearer needing to be handed over includes: determining, by the MME according to the second indication information in the E-RAB modification indication message, the bearer needing to be handed over; and sending, by the MME, at least one bearer modification request message to an SGW, where a bearer context carried in the at least one bearer modification request message includes only a context of the bearer needing to be handed over; or the at least one bearer modification request message includes first indication information, and the first indication information indicates the bearer needing to be handed over.

Optionally, the E-RAB modification indication message includes one piece of second indication information, where the indication information indicates all bearers in the E-RAB modification indication message are bearers needing to be handed over; or the E-RAB modification indication message includes a plurality of pieces of second indication information, where each bearer in the E-RAB modification indication message corresponds to one piece of second indication information, and each piece of indication information indicates whether a corresponding bearer needs to handed over.

Optionally, each bearer modification request message of the bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of first indication information indicates whether a corresponding bearer needs to be handed over.

By using the foregoing solutions, for a multi-connection scenario, a network side device can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A base station mentioned in the present invention may be a base station in a Long Term Evolution (LTE) system, may also be a base station in a Universal Mobile Telecommunications System (UMTS), and may also be a base station in another system, which is not limited in the present invention.

Figure 1:
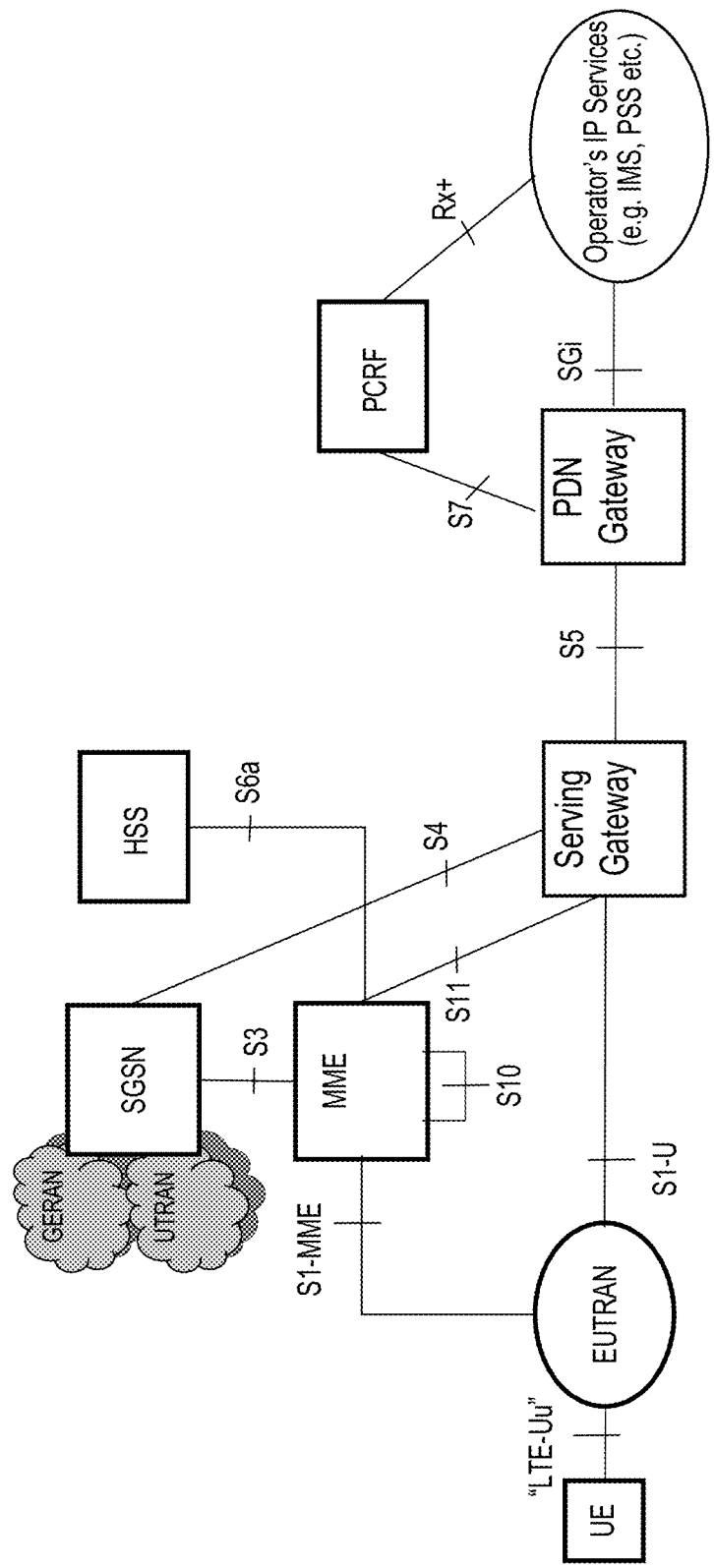
FIG. 1 is a schematic diagram of a wireless network architecture in the prior art.
Figure 2:
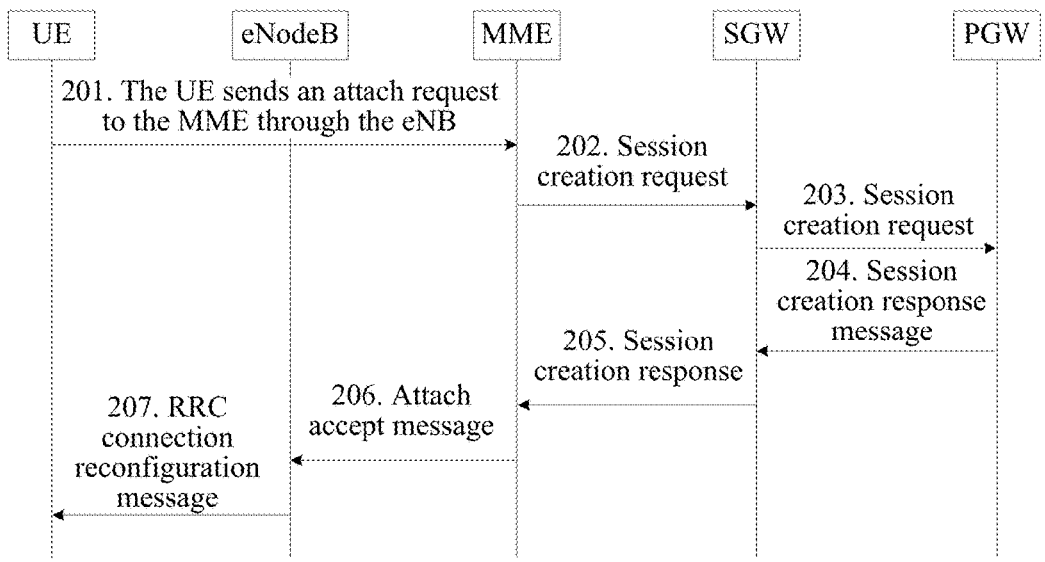
FIG. 2 is a schematic diagram in which a UE establishes a bearer by using an attach procedure.

FIG. 2 shows a communications system, and the communications system includes entities such as a source base station, a target base station, and user equipment. A process of establishing a bearer by the user equipment by using a conventional attach procedure is briefly described herein with reference to FIG. 2. Description is merely exemplary herein, and some entities, for example, a home subscriber server (HSS) entity, and related processing are omitted. Numbers of the following steps do not limit the order of the steps.

Step 201: The UE sends an attach request to an MME through an eNB.

Step 202: The MME selects a corresponding SGW and PGW, and sends a session creation request to the SGW.

Step 203: The SGW creates information about a default bearer context, and sends the session creation request to the PGW.

Step 204: The PGW creates information about a default bearer context, and sends a session creation response message to the SGW.

Step 205: The SGW returns a session creation response to the MME.

Step 206: The MME sends an attach accept message to the eNB.

Step 207: The eNB and the UE complete the attach procedure by using an RRC connection reconfiguration message.

Correspondingly, entities passed through by the foregoing bearer may correspondingly store a bearer context and related information, and record the bearer context and the related information in memories of the corresponding entities. After the bearer is successfully established, the UE establishes at least one bearer with the PGW. The SGW stores bearer contexts of all bearers corresponding to the UE. Specifically, one PDN connection exists between one UE and one PGW; and one UE may establish a plurality of PDN connections with a plurality of PGWs.

Figure 3:
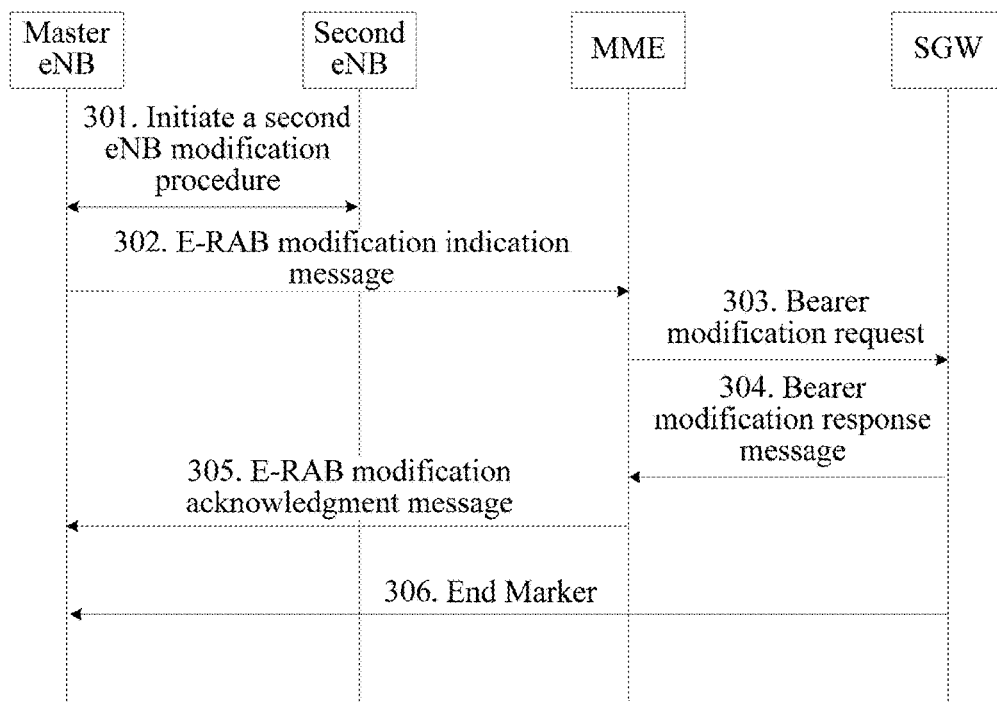
FIG. 3 is a schematic diagram of a single-connection bearer handover.

As shown in FIG. 3, a communications system includes a source base station, a target base station, and user equipment, where at least some of all bearers between the user equipment and the source base station need to be handed over from the source base station to the target base station. If existing processing for a single connection is performed in a process of completing dual connectivity by using an E-RAB modification procedure, the implementation process may be as follows:

Step 301: A first eNB (a Master eNB in FIG. 3) initiates a second eNB modification procedure, and transmits, to a second eNB, a bearer context of a bearer needing to be handed over to the second eNB, where the bearer context includes information such as a bearer identifier, QoS, an SGW address of uplink data, and a TEID.

Step 302: The first eNodeB sends an E-RAB modification indication message to an MME, where the message carries bearer contexts of all bearers of the user equipment, which include an eNB address and TEID information that correspond to each bearer, the bearer context of the bearer needing to be handed over to the second eNB carries an address and a TEID of the second eNB, and a bearer context of a bearer that does not need to be handed over carries an original eNB address and TEID.

Step 303: The MME sends a bearer modification request message to an SGW, where the message carries a bearer context, and the bearer context includes an eNB address and TEID information that correspond to a bearer.

Step 304: The SGW returns a bearer modification response message to the MME.

Step 305: The MME sends an E-RAB modification acknowledgment message to the first eNB.

Step 306: After step 303, the SGW sends, on an old path, End marker messages to the first eNB for all the bearers, and at the same time, the SGW updates, according to the bearer modification request message, eNB addresses and TEIDs that correspond to all the bearers; after receiving the End marker messages, the first eNB forwards the corresponding bearers to the second eNB. The first eNB forwards the End markers for the bearers to the second eNB. Because these End marker messages correspond to all the bearers, after receiving the End Markers, the first eNB stops receiving all subsequent packets corresponding to all the bearers. As a result, the first eNB discards subsequent downlink data of a bearer that is not to be handed over, which leads to interruption of a user service, and the second eNB does not expect to accept the bearer that does not need to be handed over, thereby causing a service contradiction.

Based on a problem of a data loss that may exist in the foregoing solution, the embodiments of the present invention provide corresponding implementation solutions for controlling a bearer handover. These implementation solutions are described in detail below.

Embodiment 1

Figure 4:
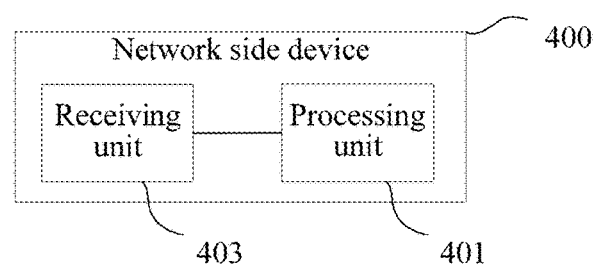
FIG. 4 is a block diagram of a network side device according to Embodiment 1 of the present invention.

As shown in FIG. 4, this embodiment of the present invention provides a network side device, configured to control a bearer handover. The network side device belongs to a wireless communications system, where the system further includes a source base station and a target base station, and at least some of all bearers between user equipment and the source base station need to be handed over from the source base station to the target base station, and the network side device 400 includes:

a receiving unit 403, configured to receive a bearer handover message; and a processing unit 401, configured to determine, according to the bearer handover message, a bearer needing to be handed over in all the bearers, so that an end marker End Marker message is sent to the source base station only for the bearer needing to be handed over.

By using the foregoing solution, for a multi-connection scenario, a network side device can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

The network side device in this embodiment may be a serving gateway SGW, and may also be a mobility management entity MME, which is described specifically below.

Embodiment 2

A technical solution in which a network side device is an SGW is described in this embodiment.

Figure 5:
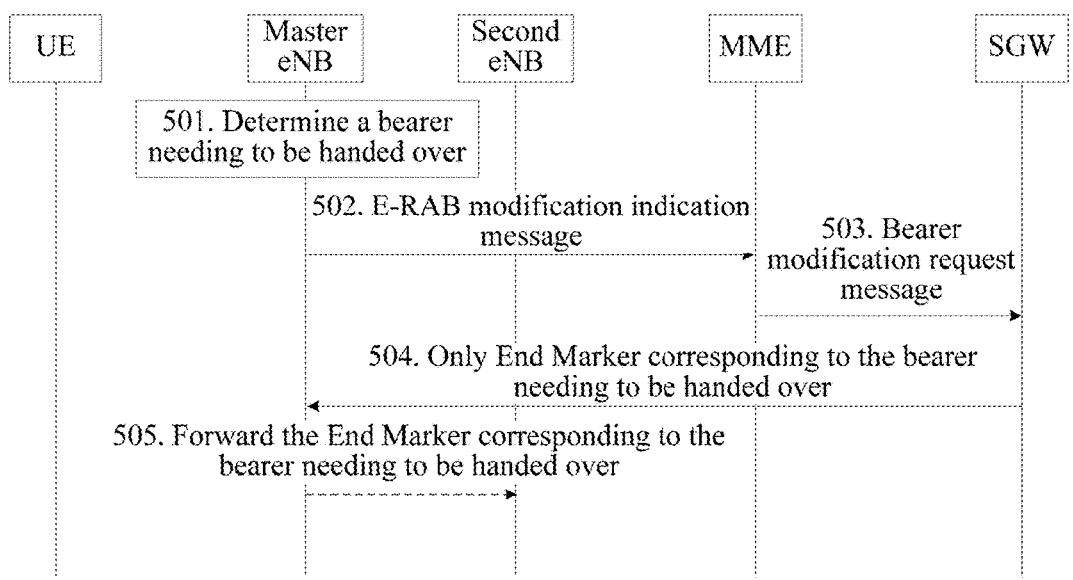
FIG. 5 is a schematic diagram of a technical solution for controlling a bearer handover according to Embodiment 2 of the present invention.

This embodiment provides a technical solution, where a UE keeps in communication with a source base station, and the source base station prepares, according to conditions of bearers, to hand over some of the bearers to a target base station. Specifically, as shown in FIG. 5, the solution may include the following steps:

Step 501: The source base station may determine, by using a parameter such as Qos of the UE or the source base station or a load condition between the UE and the source base station, a bearer needing to be handed over.

There are one or more bearers needing to be handed over.

Step 502: The source base station sends an E-RAB modification indication message to an MME, where bearer contexts included in the E-RAB modification indication message correspond to all the bearers; the MME sends at least one bearer modification request message to the SGW according to the E-RAB modification indication message, where bearer contexts included in the at least one bearer modification request message correspond to all the bearers.

The at least one bearer modification request message sent by the MME may include a plurality of bearer modification request messages. Each bearer modification request message corresponds to one PDN connection, a bearer corresponding to a context included in each bearer modification request message corresponds to the PDN connection corresponding to the bearer modification request message, and the contexts included in all the bearer modification request messages correspond to all the bearers.

Step 503: The SGW may receive the at least one bearer modification request message sent by the mobility management entity MME, where the bearer contexts included in the at least one bearer modification request message correspond to all the bearers; the SGW may determine, according to the bearer contexts in the at least one bearer modification request message, the bearer needing to be handed over.

Subsequently, the SGW may send a bearer modification response message to the MME, and the MME may send an E-RAB modification acknowledgment message to the source base station, and details are not described herein.

Step 504: The SGW may send an End Marker message to the source base station only for the bearer needing to be handed over.

Step 505: After receiving the End Marker message, the source base station may forward the received End Marker message to the target base station.

The End Marker message received by the source base station corresponds only to the bearer needing to be handed over, and does not include a bearer that does not need to be handed over. Correspondingly, the source base station reserves the bearer that does not need to be handed over, and stops a subsequent packet of the bearer needing to be handed over. The source base station transfers, to the target base station, the bearer needing to be handed over. The source base station may also forward the received End Marker message to the target base station; after receiving the message, the target base station may confirm that the source base station has completed sending a data stream of the bearer needing to be handed over, and start communication between the target base station and the corresponding UE and network side device.

Figure 6:
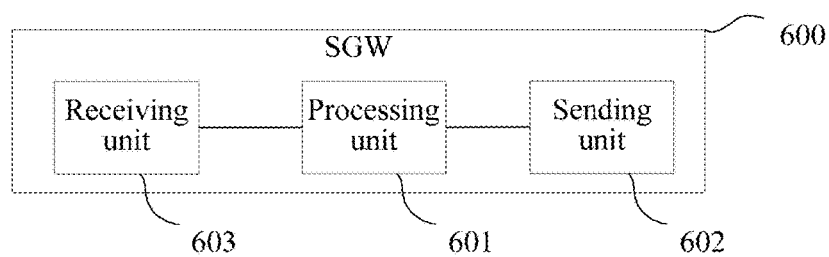
FIG. 6 is a block diagram of an SGW according to Embodiment 2 of the present invention.
Figure 7:
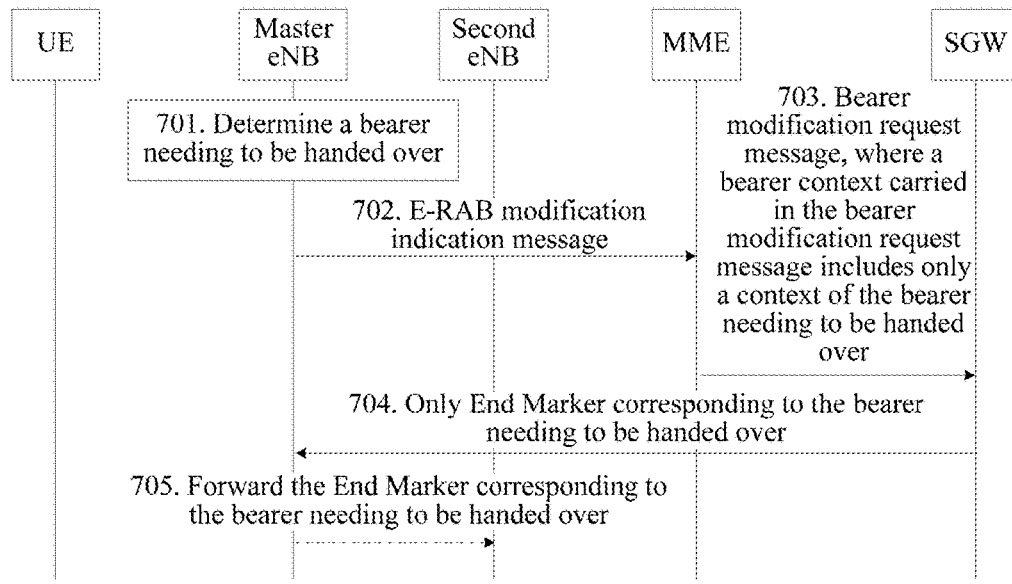
FIG. 7 is a schematic diagram of a technical solution for controlling a bearer handover according to Embodiment 3 of the present invention.

Correspondingly, as shown in FIG. 6, the SGW 600 may include: a receiving unit 603, configured to receive the at least one bearer modification request message sent by the mobility management entity MME, where the bearer contexts included in the at least one bearer modification request message correspond to all the bearers;

a processing unit 601, configured to determine, according to the bearer contexts in the at least one bearer modification request message, the bearer needing to be handed over; and a sending unit 602, configured to send the End Marker message to the source base station only for the bearer needing to be handed over.

The sending the End Marker message only for the bearer needing to be handed over refers to that the End Marker message is sent for the bearer needing to be handed over, and the End Marker message is not sent for the bearer that does not need to be handed over.

The bearer refers to a transmission channel between user equipment and a PGW. The transmission channel includes entities such as the user equipment, a base station, an MME, an SGW, and the PGW. When the SGW sends the End Marker message, in order to prevent a loss of an End Marker, at least one End Marker may be sent for each bearer.

By using the foregoing solution, for a multi-connection scenario, an SGW can determine a bearer needing to be handed over, so that the SGW sends an end marker message only for the bearer needing to be handed over, which can prevent discarding of subsequent data of a bearer that is not to be handed over, and ensure multiple connections between a UE and base stations, thereby improving stability of a system.

Further, the bearer contexts included in the at least one bearer modification request message include F-TEIDs. Each bearer context corresponds to one F-TEID. The SGW matches the F-TEIDs of the received bearer contexts with F-TEIDs in corresponding bearer contexts that are obtained by the SGW during bear establishment. When an F-TEID of a bearer is changed, it is determined that the bearer is a bearer needing to be handed over. Generally, the SGW may obtain corresponding bearer contexts during bearer establishment, and store the corresponding bearer contexts in a memory of the SGW. The F-TEIDs generally include base station addresses and TEID information. The SGW may also obtain, by matching only the base station addresses, the bearer needing to be handed over. The SGW may also obtain, by matching the base station addresses and TEID information, the bearer needing to be handed over.

Correspondingly, the processing unit of the SGW configured to determine, according to the bearer contexts in the at least one bearer modification request message, the bearer needing to be handed over includes: being configured to match the F-TEIDs in the bearer contexts in the at least one bearer modification request message with F-TEIDs in bearer contexts that are currently stored by the SGW, and when an F-TEID of a bearer is changed, determine that the bearer is a bearer needing to be handed over; or being configured to match the base station addresses in the bearer contexts in the at least one bearer modification request message with base station addresses in bearer contexts that are currently stored by the SGW, and when a base station address of a bearer is changed, determine that the bearer is a bearer needing to be handed over.

Further, the processing unit of the SGW is further configured to reserve a context of the bearer that does not need to be handed over. In this way, the SGW can keep normal communication of an original bearer.

In the foregoing solution, a bearer needing to be handed over can be determined by matchingF-TEIDs or base station addresses; therefore, subsequently, a corresponding End Marker is sent only for the bearer needing to be handed over. In the solution, new signaling does not need to be added additionally, thereby saving a signaling resource.

As another possible implementation manner, the SGW can obtain the bearer needing to be handed over, without matching the F-TEIDs or the base station addresses. The SGW may indicate, by using indication information, the bearer needing to be handed over. Specifically, the E-RAB modification indication message sent by the source base station to the MME includes second indication information, and the second indication information indicates the bearer needing to be handed over. The MME generates, according to the E-RAB modification indication message and the corresponding second indication information, at least one bearer modification request message, where the bearer modification request message includes first indication information, and the first indication information indicates the bearer needing to be handed over; the MME sends the at least one bearer modification request message to the SGW. The SGW may receive the at least one bearer modification request message sent by the mobility management entity MME, where the bearer modification request message includes the first indication information, and the first indication information indicates the bearer needing to be handed over; determine, according to the first indication information in the at least one bearer modification request message, the bearer needing to be handed over; and send the End Marker message to the source base station only for the bearer needing to be handed over. A process between the source base station and the target base station is consistent with the foregoing solution for performing matching on the F-TEIDs or the base station addresses, and details are not described again.

Correspondingly, the receiving unit configured to receive a bearer handover message includes: a receiving unit, configured to receive the at least one bearer modification request message sent by the mobility management entity MME, where the bearer modification request message includes the first indication information, and the first indication information indicates the bearer needing to be handed over;

the processing unit is configured to determine, according to the first indication information in the at least one bearer modification request message, the bearer needing to be handed over; and the sending unit is configured to send the End Marker message to the source base station only for the bearer needing to be handed over.

First indication information is added to a bearer modification request message to determine a bearer needing to be handed over, so that an SGW does not need to perform an additional matching action, thereby saving a computing resource.

In addition, different granularities may be used for the first indication information that is in the bearer modification request message and that the MME notifies to the SGW, which includes that: one bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of indication information indicates whether a corresponding bearer needs to be handed over. The bearer needing to be handed over can be indicated by both of the foregoing two solutions. In the first solution, one piece of indication information is used to indicate a plurality of bearers, which can save signaling. By using the second solution, whether each bearer needs to be handed over can be accurately indicated, so that an indication is more accurate.

Further, the processing unit of the SGW is further configured to reserve a context of a bearer that does not need to be handed over. In this way, the SGW can keep normal communication of an original bearer.

Embodiment 3

A technical solution in which a network side device is an MME is described in this embodiment.

Similar to the solution in FIG. 5, this embodiment provides a technical solution. Specifically, the solution may include the following steps:

Step 701: A source base station determines a bearer needing to be handed over, and sends an E-RAB modification indication message to an MME, where bearer contexts included in the E-RAB modification indication message correspond to all bearers.

Step 702: The MME determines, according to the bearer contexts in the E-RAB modification indication message, the bearer needing to be handed over.

Step 703: The MME sends a bearer modification request message to an SGW, where a bearer context carried in the bearer modification request message includes only a context of the bearer needing to be handed over.

Step 704: The SGW sends, according to the bearer context carried in the received bearer modification request message, an End Marker message to the source base station only for the bearer needing to be handed over.

A subsequent process between the source base station and a target base station is consistent with the solution in FIG. 5, and details are not described again.

It should be noted that in this embodiment, the MME needs to store bearer contexts of all the bearers after bearer establishment. Correspondingly, the SGW does not delete a context of a bearer that is not included in the bearer modification request message from the MME, and reserves the bearer as a bearer that does not need to be handed over.

Figure 8:
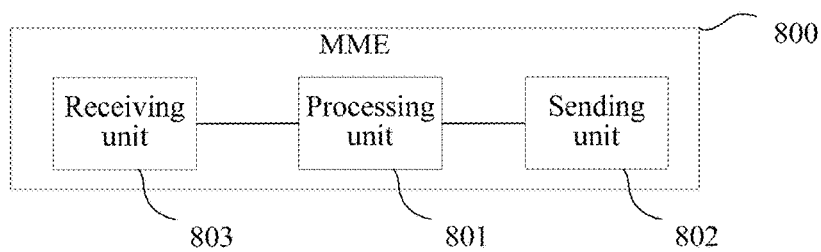
FIG. 8 is a block diagram of an MME according to Embodiment 3 of the present invention.

Correspondingly, as shown in FIG. 8, the MME 800 may include:

a receiving unit 803, configured to receive the E-RAB modification indication message sent by the source base station, where the bearer contexts included in the E-RAB modification indication message correspond to all the bearers; and a processing unit 801, configured to determine, according to the bearer contexts in the E-RAB modification indication message, the bearer needing to be handed over; and a sending unit 802, configured to send the bearer modification request message to the SGW, where the bearer context carried in the bearer modification request message includes only the bearer context of the bearer needing to be handed over.

Correspondingly, a receiving unit of the SGW is configured to receive the bearer modification request message, where the bearer modification request message indicates the bearer needing to be handed over and the context of the bearer needing to be handed over;

a processing unit of the SGW is configured to generate the End Marker message according to the bearer modification request message for the bearer needing to be handed over; and a sending unit of the SGW sends the End Marker message for the bearer needing to be handed over.

Further, the processing unit of the SGW is further configured to reserve the context of the bearer that does not need to be handed over.

By using the foregoing solution, for a multi-connection scenario, an MME can determine a bearer needing to be handed over, so that an SGW can send an end marker message only for the bearer needing to be handed over, which can prevent discarding of subsequent data of a bearer that is not to be handed over, and ensure multiple connections between a UE and base stations, thereby improving stability of a system.

Further, the bearer contexts included in the E-RAB modification indication message include F-TEIDs. The MME matches the F-TEIDs of the received bearer contexts with F-TEIDs in corresponding bearer contexts that are obtained by the MME during bear establishment. When an F-TEID of a bearer is changed, it is determined that the bearer is a bearer needing to be handed over. Generally, the MME may obtain corresponding bearer contexts during bearer establishment, and store the corresponding bearer contexts in a memory of the MME. Similar to Embodiment 2, the MME may also obtain, by matching only changes of base station addresses, the bearer needing to be handed over. The MME may also obtain, by matching the base station addresses and TED information, the bearer needing to be handed over.

Correspondingly, the processing unit of the MME configured to determine, according to the bearer contexts in the E-RAB modification indication message, the bearer needing to be handed over includes: being configured to match the F-TEIDs in the bearer contexts of all the bearers in the E-RAB modification indication message with F-TEIDs in currently stored bearer contexts, and when an F-TEID of a bearer is changed, determine that the bearer is a bearer needing to be handed over; or being configured to match base station addresses in the bearer contexts of all the bearers in the E-RAB modification indication message with base station addresses in bearer contexts that are currently stored by the MME, and when a base station address of a bearer is changed, determine that the bearer is a bearer needing to be handed over.

A bearer needing to be handed over can be determined by matching F-TEIDs or base station addresses, which can satisfy a requirement of a multi-connection scenario without adding new signaling additionally.

As another possible implementation manner, similar to that in Embodiment 1, the MME can obtain the bearer needing to be handed over, without matching the F-TEIDs or the base station addresses. The MME may indicate, by using indication information, the bearer needing to be handed over. Specifically, the E-RAB modification indication message sent by the source base station to the MME includes second indication information, and the second indication information indicates the bearer needing to be handed over. The MME determines, according to the second indication information in the E-RAB modification indication message, the bearer needing to be handed over; the MME sends at least one bearer modification request message to the SGW, where a bearer context carried in the at least one bearer modification request message includes only the context of the bearer needing to be handed over, or the at least one bearer modification request message includes first indication information, where the first indication information indicates the bearer needing to be handed over. The SGW may receive the at least one bearer modification request message sent by the mobility management entity MME, and send the End Marker message to the source base station only for the bearer needing to be handed over. A process between the source base station and the target base station is consistent with the foregoing solution for performing matching on the F-TEIDs or the base station addresses, and details are not described again.

Correspondingly, the receiving unit of the MME configured to receive a bearer handover message includes:

a receiving unit, configured to receive the E-RAB modification indication message sent by the source base station, where the E-RAB modification indication message includes the second indication information, and the second indication information indicates the bearer needing to be handed over;

the processing unit configured to determine, according to the bearer handover message, a bearer needing to be handed over in all the bearers, so that an end marker End Marker message is sent to the source base station only for the bearer needing to be handed over includes:

a processing unit, configured to determine, according to the second indication information in the E-RAB modification indication message, the bearer needing to be handed over; and the sending unit is configured to send the at least one bearer modification request message to the SGW, where the bearer context carried in the at least one bearer modification request message includes only the context of the bearer needing to be handed over; or the at least one bearer modification request message includes the first indication information, and the first indication information indicates the bearer needing to be handed over.

Second indication information is added to an E-RAB modification indication message to determine a bearer needing to be handed over, so that an MME does not need to perform an additional matching action, thereby saving a computing resource.

Similar to Embodiment 2, different granularities may be used for the second indication information that is in the E-RAB modification indication message and that the source base station notifies to the MME, which includes that: the E-RAB modification indication message includes one piece of second indication information, where the second indication information indicates all the bearers in the E-RAB modification indication message are bearers needing to be handed over; or the E-RAB modification indication message includes a plurality of pieces of second indication information, where each bearer in the E-RAB modification indication message corresponds to one piece of second indication information, and each piece of indication information indicates whether a corresponding bearer needs to handed over. The bearer needing to be handed over can be indicated by both of the foregoing two solutions. In the first solution, one piece of indication information is used to indicate a plurality of bearers, which can save signaling. By using the second solution, whether each bearer needs to be handed over can be accurately indicated, so that an indication is more accurate.

Same as Embodiment 1, different granularities may also be used for the first indication information that is in the bearer modification request message and that the MME notifies to the SGW. Specifically, in the network device in this embodiment, each bearer modification request message of the bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of indication information indicates whether a corresponding bearer needs to be handed over.

Embodiment 4

Figure 9:
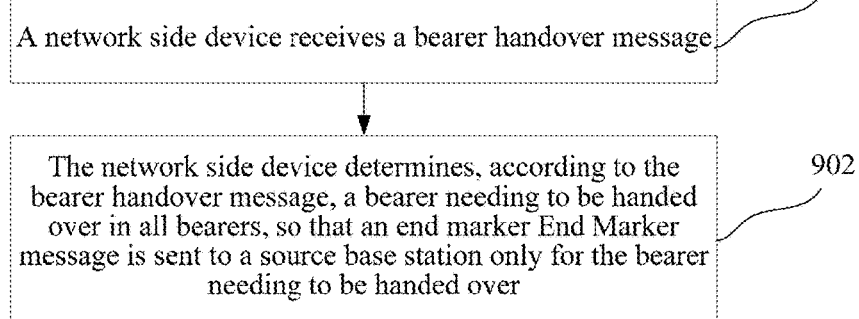
FIG. 9 is a schematic diagram of a bearer handover control method according to Embodiment 4 of the present invention.

This embodiment of the present invention provides a bearer handover control method. The method is applicable to a wireless communications system, where the system includes a network side device, a source base station, a target base station, and user equipment, and at least some of all bearers between the user equipment and the source base station need to be handed over from the source base station to the target base station. As shown in FIG. 9, the method includes the following steps:

901: The network side device receives a bearer handover message.

902: The network side device determines, according to the bearer handover message, a bearer needing to be handed over in all the bearers, so that an end marker End Marker message is sent to the source base station only for the bearer needing to be handed over.

By using the foregoing solution, for a multi-connection scenario, a network side device can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

A process of establishing the bearer is consistent with that in Embodiment 1, and details are not described again.

Embodiment 5

A control method in which a network side device is an SGW is described in this embodiment.

For detailed description of the principle of this embodiment and related entities, reference is made to Embodiment 2, and details are not described again.

Figure 10:
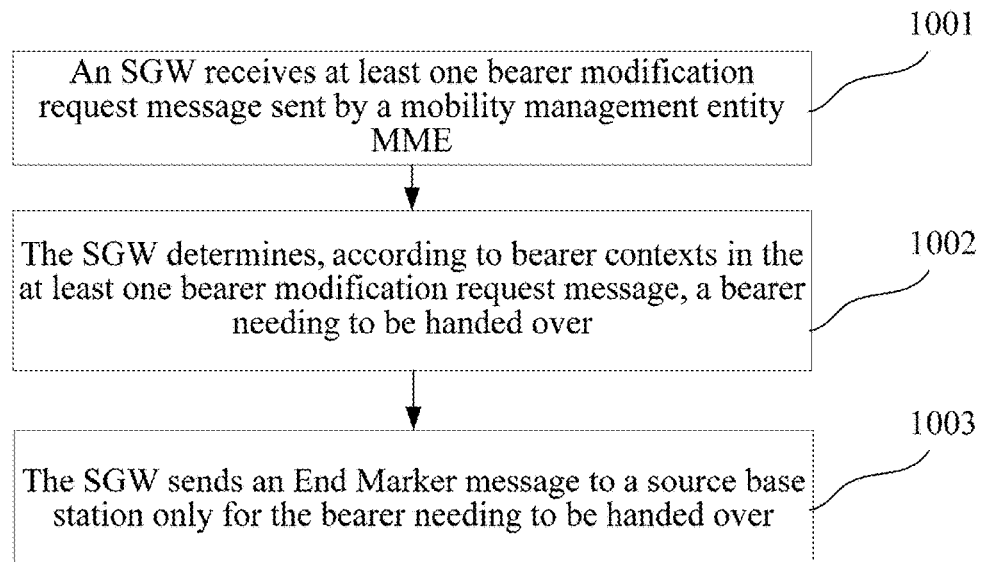
FIG. 10 is a schematic diagram of a bearer handover control method according to Embodiment 5 of the present invention.

As shown in FIG. 10, in the control method provided in this embodiment, the network side device is a serving gateway SGW. The method includes:

1001: The SGW receives at least one bearer modification request message sent by a mobility management entity MME, where bearer contexts included in the at least one bearer modification request message correspond to all bearers.

1002: The SGW determines, according to the bearer contexts in the at least one bearer modification request message, a bearer needing to be handed over.

1003: The SGW sends an End Marker message to a source base station only for the bearer needing to be handed over.

By using the foregoing solution, for a multi-connection scenario, an SGW can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

Further, the bearer contexts included in the at least one bearer modification request message include F-TEIDs. For the specific principle, reference is made to Embodiment 2.

Correspondingly, in the control method in this embodiment, the determining, by the SGW according to the bearer contexts in the at least one bearer modification request message, a bearer needing to be handed over includes:

matching, by the SGW, the F-TEIDs in the bearer contexts in the at least one bearer modification request message with F-TEIDs in bearer contexts that are currently stored by the SGW, and when an F-TEID of a bearer is changed, determining that the bearer is a bearer needing to be handed over; or matching, by the SGW, base station addresses in the bearer contexts in the at least one bearer modification request message with base station addresses in bearer contexts that are currently stored by the SGW, and when a base station address of a bearer is changed, determining that the bearer is a bearer needing to be handed over.

Further, the SGW may reserve a context of a bearer that does not need to be handed over. In this way, the SGW can keep normal communication of an original bearer.

A bearer needing to be handed over can be determined by matching of F-TEIDs or base station addresses, which can satisfy a requirement of a multi-connection scenario without adding new signaling additionally.

As another possible implementation manner, the SGW can obtain the bearer needing to be handed over, without matching the F-TEIDs or the base station addresses. The SGW may indicate, by using indication information, the bearer needing to be handed over. For the specific principle, reference is made to Embodiment 2.

Correspondingly, in the control method in this embodiment, the network side device is a serving gateway SGW, where receiving, by the network side device, a bearer handover message includes:

receiving, by the SGW, the at least one bearer modification request message sent by the mobility management entity MME, where the bearer modification request message includes first indication information, and the first indication information indicates the bearer needing to be handed over; and determining, by the network side device according to the bearer handover message, a bearer needing to be handed over in all the bearers, so that an end marker End Marker message is sent to the source base station only for the bearer needing to be handed over includes:

determining, by the SGW according to the first indication information in the at least one bearer modification request message, the bearer needing to be handed over; and sending, by the SGW, the End Marker message to the source base station only for the bearer needing to be handed over.

First indication information is added to a bearer modification request message to determine a bearer needing to be handed over, so that an SGW does not need to perform an additional matching action, thereby saving a computing resource.

Different granularities may be used for the first indication information that is in the bearer modification request message and that the MME notifies to the SGW, which includes that: one bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of indication information indicates whether a corresponding bearer needs to be handed over. The bearer needing to be handed over can be indicated by both of the foregoing two solutions. In the first solution, one piece of indication information is used to indicate a plurality of bearers, which can save signaling. By using the second solution, whether each bearer needs to be handed over can be accurately indicated, so that an indication is more accurate.

Further, the SGW may reserve a context of a bearer that does not need to be handed over. In this way, the SGW can keep normal communication of an original bearer.

Embodiment 6

A control method in which a network side device is an MME is described in this embodiment.

For detailed description of the principle of this embodiment and related entities, reference is made to Embodiment 3, and details are not described again.

It should be noted that in this embodiment, the MME needs to store bearer contexts of all bearers after bearer establishment. Correspondingly, an SGW does not delete a context of a bearer that is not included in a bearer modification request message from the MME, and reserves the bearer as a bearer that does not need to be handed over.

Figure 11:
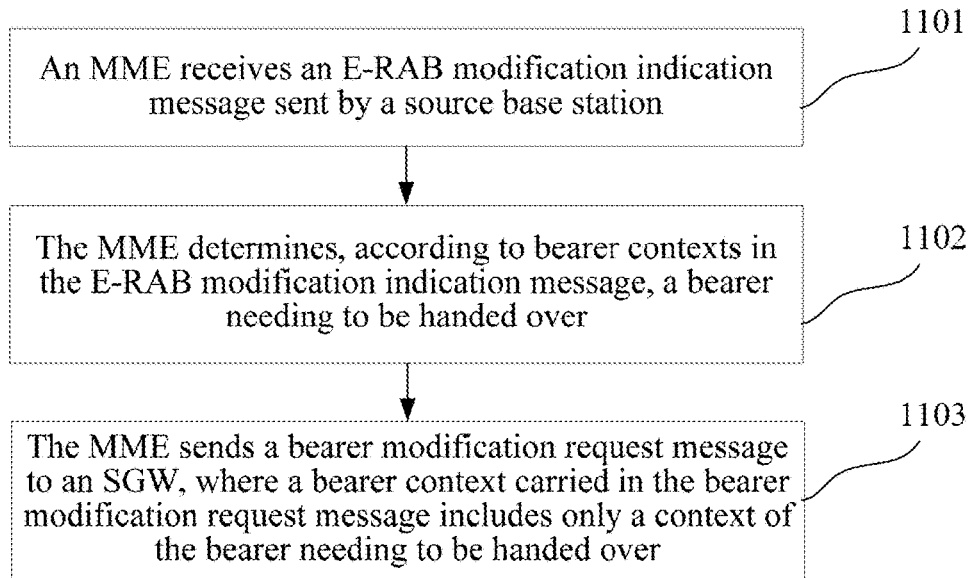
FIG. 11 is a schematic diagram of a bearer handover control method according to Embodiment 6 of the present invention.

As shown in FIG. 11, in the control method in this embodiment, the network side device is a mobility management entity MME. The method includes:

1101: The MME receives an E-RAB modification indication message sent by a source base station, where bearer contexts included in the E-RAB modification indication message correspond to all bearers.

1102: The MME determines, according to the bearer contexts in the E-RAB modification indication message, a bearer needing to be handed over.

1103: The MME sends a bearer modification request message to an SGW, where a bearer context carried in the bearer modification request message includes only a context of the bearer needing to be handed over.

Correspondingly, a control method of the SGW is:

receiving the bearer modification request message, where the bearer modification request message indicates the bearer needing to be handed over and the context of the bearer needing to be handed over;

generating an End Marker message according to the bearer modification request message for the bearer needing to be handed over; and sending the End Marker message for the bearer needing to be handed over.

Further, the control method of the SGW further includes: reserving, by the SGW, a context of a bearer that does not need to be handed over.

By using the foregoing solution, for a multi-connection scenario, an MME can determine a bearer needing to be handed over, so that an SGW can send an end marker message only for the bearer needing to be handed over, which can prevent discarding of subsequent data of a bearer that is not to be handed over, and ensure multiple connections between a UE and base stations, thereby improving stability of a system.

Further, the bearer contexts included in the E-RAB modification indication message include F-TEIDs. For the specific principle, reference is made to Embodiment 3.

Correspondingly, in the control method in this embodiment, the determining, by the MME according to the bearer contexts in the E-RAB modification indication message, a bearer needing to be handed over includes:

matching, by the MME, the F-TEIDs in the bearer contexts of all the bearers in the E-RAB modification indication message with F-TEIDs of currently stored bearer contexts, and when an F-TEID of a bearer is changed, determining that the bearer is a bearer needing to be handed over; or matching, by the MME, target base station addresses in the bearer contexts of all the bearers in the E-RAB modification indication message with base station addresses in bearer contexts that are currently stored by the MME, and when a base station address of a bearer is changed, determining that the bearer is a bearer needing to be handed over.

A bearer needing to be handed over can be determined by matching of F-TEIDs or base station addresses, which can satisfy a requirement of a multi-connection scenario without adding new signaling additionally.

As another possible implementation manner, similar to that in Embodiment 1, the MME can obtain the bearer needing to be handed over, without matching the F-TEIDs or the base station addresses. The MME may indicate, by using indication information, the bearer needing to be handed over. For the specific principle, reference is made to Embodiment 3.

Correspondingly, in the control method in this embodiment, the network side device is a mobility management entity MME, where receiving, by the network side device, a bearer handover message includes: receiving, by the MME, the E-RAB modification indication message sent by the source base station, where the E-RAB modification indication message includes second indication information, and the second indication information indicates the bearer needing to be handed over; and determining, by the network side device according to the bearer handover message, a bearer needing to be handed over in all bearers, so that an end marker End Marker message is sent to the source base station only for the bearer needing to be handed over includes:

determining, by the MME according to the second indication information in the E-RAB modification indication message, the bearer needing to be handed over; and sending, by the MME, at least one bearer modification request message to the SGW, where a bearer context carried in the at least one bearer modification request message includes only the context of the bearer needing to be handed over; or the at least one bearer modification request message includes first indication information, and the first indication information indicates the bearer needing to be handed over.

Second indication information is added to an E-RAB modification indication message to determine a bearer needing to be handed over, so that an MME does not need to perform an additional matching action, thereby saving a computing resource.

Similar to Embodiment 3, different granularities may be used for the second indication information that is in the E-RAB modification indication message and that the source base station notifies to the MME, which includes that: the E-RAB modification indication message includes one piece of second indication information, where the indication information indicates all the bearers in the E-RAB modification indication message are bearers needing to be handed over; or the E-RAB modification indication message includes a plurality of pieces of second indication information, where each bearer in the E-RAB modification indication message corresponds to one piece of second indication information, and each piece of indication information indicates whether a corresponding bearer needs to handed over. The bearer needing to be handed over can be indicated by both of the foregoing two solutions. In the first solution, one piece of indication information is used to indicate a plurality of bearers, which can save signaling. By using the second solution, whether each bearer needs to be handed over can be accurately indicated, so that an indication is more accurate.

Same as Embodiment 1, different granularities may also be used for the first indication information that is in the bearer modification request message and that the MME notifies to the SGW. Specifically, in the control method in this embodiment, each bearer modification request message of the bearer modification request message includes one piece of first indication information, where the first indication information indicates that all bearers in the bearer modification request are bearers needing to be handed over; or each bearer modification request message of the at least one bearer modification request message includes a plurality of pieces of first indication information, where each bearer in the bearer modification request corresponds to one piece of first indication information, and each piece of first indication information indicates whether a corresponding bearer needs to be handed over.

Embodiment 7

The foregoing embodiments mainly describe improvement of an SGW or an MME. A technical solution of a source base station is described below. The solution can also implement bearer control in a multi-connection scenario.

As described in Embodiment 2, a UE keeps in communication with a source base station, and the source base station prepares, according to conditions of bearers, to hand over some of the bearers to a target base station. Specifically, the source base station may determine, by using a parameter such as Qos of the UE or the source base station or a load condition between the UE and the source base station, a bearer needing to be handed over. In this embodiment, bearer contexts obtained by the source base station, an MME, and an SGW correspond to all bearers. Correspondingly, End Marker messages sent by the SGW correspond to all the bearers, that is, a bearer needing to be handed over is included, and a bearer that does not need to be handed over is also included. In this embodiment, the source base station may discard, according to the bearer needing to be handed over and determined by the source base station, an END marker message corresponding to the bearer that does not need to be handed over. In this way, the bearer that does not need to be handed over is reserved, and the UE continues to communicate on a bearer of the source base station. Correspondingly, the source base station forwards an End Marker message to the target base station. The forwarded End Marker message corresponds to the bearer needing to be handed over. After receiving the message, the target base station may confirm that the source base station has completed sending the bearer needing to be handed over, and start communication between the target base station and the corresponding UE and network side device.

Correspondingly, this embodiment provides a base station, configured for a bearer handover. The base station belongs to a wireless communications system, where the system includes an SGW and a target base station, and at least some of all bearers between user equipment and the base station needs to be handed over from the base station to the target base station, and the base station includes:

a receiving unit, configured to receive End Marker messages sent by the SGW, where the End Marker messages are End Marker messages corresponding to all bearers; and a processing unit, configured to determine a bearer needing to be handed over, and further configured to discard, according to the determined bearer needing to be handed over, an End Marker message corresponding to a bearer that does not need to be handed over.

Further, the base station may further include a sending unit, configured to forward, to the target base station, an End Marker message corresponding to the bearer needing to be handed over.

Optionally, a context of the bearer needing to be handed over may be stored in a memory of the base station.

Specifically, the processing unit of the base station is configured to match a bearer corresponding to an End Marker message with the determined bearer needing to be handed over, and when the two are inconsistent, discard the End Marker message corresponding to the bearer, or when the two are consistent, forward the End Marker message corresponding to the bearer to the target base station. In this way, the base station reserves the bearer that does not need to be handed over, so that a communication break is not caused.

In addition, this embodiment provides a base station, configured for a bearer handover. The base station belongs to a wireless communications system, where the system includes an SGW and a target base station, and at least some of all bearers between user equipment and the base station needs to be handed over from the base station to the target base station, and the base station includes:

a receiver, configured to receive End Marker messages sent by the SGW, where the End Marker messages are End Marker messages corresponding to all bearers; and a processor, configured to determine a bearer needing to be handed over, and further configured to discard, according to the determined bearer needing to be handed over, an End Marker message corresponding to a bearer that does not need to be handed over.

Further, the base station may further include a transmitter, configured to forward, to the target base station, an End Marker message corresponding to the bearer needing to be handed over.

Optionally, a context of the bearer needing to be handed over may be stored in a memory of the base station.

Specifically, the processing unit of the base station is configured to match a bearer corresponding to an End Marker message with the determined bearer needing to be handed over, and when the two are inconsistent, discard the End Marker message corresponding to the bearer, or when the two are consistent, forward the End Marker message corresponding to the bearer to the target base station. In this way, the base station reserves the bearer that does not need to be handed over, so that a communication break is not caused.

This embodiment provides a control method used by a base station. The method is applicable to a wireless communications system, where the system includes an SGW, a source base station, and a target base station, and at least some of all bearers between user equipment and the source base station need to be handed over from the source base station to the target base station, and the method includes the following steps:

receiving, by the source base station, End Marker messages, where the End Marker messages are End Marker messages corresponding to all the bearers;

determining, by the source base station, a bearer needing to be handed over; and discarding, by the source base station according to the determined bearer needing to be handed over, an End Marker message corresponding to a bearer that does not need to be handed over.

Further, an End Marker message corresponding to the bearer needing to be handed over may be forwarded to the target base station.

Specifically, the source base station matches a bearer corresponding to an End Marker message with the determined bearer needing to be handed over, and when the two are inconsistent, discards the End Marker message corresponding to the bearer, or when the two are consistent, forwards the End Marker message corresponding to the bearer to the target base station. In this way, the source base station reserves the bearer that does not need to be handed over, so that a communication break is not caused.

By using the foregoing solution, for a multi-connection scenario, a base station can determine a bearer needing to be handed over, and discard an end marker message corresponding to a bearer that does not need to be handed over, which can prevent discarding of subsequent data of a bearer that is not to be handed over, and ensure multiple connections between a UE and base stations, thereby improving stability of a system.

Embodiment 8

This embodiment is also an improved solution of a source base station. The solution can also implement bearer control in a multi-connection scenario.

As described in Embodiment 2, a UE keeps in communication with a source base station, and the source base station prepares, according to conditions of bearers, to hand over some of the bearers to a target base station. Specifically, the source base station may determine, by using a parameter such as Qos of the UE or the source base station or a load condition between the UE and the source base station, a bearer needing to be handed over. In this embodiment, the source base station sends only an E-RAB modification indication message corresponding to the bearer needing to be handed over to an MME. Correspondingly, the MME sends a bearer modification request to an SGW according to the E-RAB modification indication message, where the bearer modification request corresponds only to the bearer needing to be handed over; the SGW sends an End Marker message to the source base station according to the bearer modification request, where the End Marker message corresponds only to the bearer needing to be handed over. It should be noted that, the SGW and/or the MME needs to reserve a context of a bearer that does not need to be handed over. The End Marker message received by the source base station corresponds only to the bearer needing to be handed over, where the bearer that does not need to be handed over is not included. Correspondingly, the source base station reserves the bearer that does not need to be handed over, and stops a subsequent packet of the bearer needing to be handed over. The source base station transfers, to the target base station, the bearer needing to be handed over. The source base station may also forward the received End Marker message to the target base station; after receiving the message, the target base station may confirm that the source base station has completed sending the bearer needing to be handed over, and start communication between the target base station and the corresponding UE and network side device.

Correspondingly, this embodiment provides a base station, configured for a bearer handover. The base station belongs to a wireless communications system, where the system includes an SGW, an MME, and a target base station, and at least some of all bearers between user equipment and the base station needs to be handed over from the source base station to the target base station, and the base station includes:

a receiving unit, configured to determine a bearer needing to be handed over, and a sending unit, configured to send an E-RAB modification indication message to the MME, where the E-RAB modification indication message includes only a context of the bearer needing to be handed over, where the receiving unit is further configured to receive an End Marker message sent by the SGW, where the End Marker message corresponds only to the bearer needing to be handed over.

Further, the sending unit of the base station is further configured to forward, to the target base station, the End Marker message corresponding to the bearer needing to be handed over.

In addition, this embodiment provides a base station, configured for a bearer handover. The base station belongs to a wireless communications system, where the system includes an SGW, an MME, and a target base station, and at least some of all bearers between user equipment and the base station needs to be handed over from the source base station to the target base station, and the base station includes:

a receiver, configured to determine a bearer needing to be handed over, and a transmitter, configured to send an E-RAB modification indication message to the MME, where the E-RAB modification indication message includes only a context of the bearer needing to be handed over, where the receiver is further configured to receive an End Marker message sent by the SGW, where the End Marker message corresponds only to the bearer needing to be handed over.

Further, the transmitter of the base station is further configured to forward, to the target base station, the End Marker message corresponding to the bearer needing to be handed over.

This embodiment provides a control method used by a base station. The method is applicable to a wireless communications system, where the system includes an SGW, an MME, a source base station, and a target base station, and at least some of all bearers between user equipment and the source base station need to be handed over from the source base station to the target base station, and the method includes the following steps:

determining, by the source base station, a bearer needing to be handed over.

sending, by the source base station, an E-RAB modification indication message to the MME, where the E-RAB modification indication message includes only a context of the bearer needing to be handed over; and receiving, by the source base station, an End Marker message sent by the SGW, where the End Marker message corresponds only to the bearer needing to be handed over. Further, the End Marker message corresponding to the bearer needing to be handed over may be forwarded to the target base station.

Correspondingly, this embodiment provides a communications system, configured for a bearer handover. The system includes an SGW, an MME, a source base station, and a target base station, where at least some of all bearers between user equipment and the source base station need to be handed over from the source base station to the target base station, and the source base station is the base station in this embodiment.

Because an End Marker message is generated only for a bearer needing to be handed over and no corresponding End Marker message is generated for a bearer that does not need to be handed over, the bearer that does not need to be handed over does not cause a communication break. By using the foregoing solution, for a multi-connection scenario, a source base station can prevent discarding of subsequent data of a bearer that is not to be handed over, and ensure multiple connections between a UE and base stations, thereby improving stability of a system.

Embodiment 9

Figure 12:
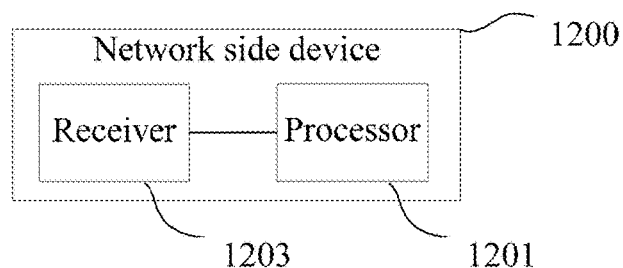
FIG. 12 is a block diagram of a network side device according to Embodiment 9 of the present invention.

This embodiment of the present invention provides a network side device, configured to control a bearer handover. The network side device belongs to a wireless communications system, where the system further includes a source base station and a target base station, and at least some of all bearers between user equipment and the source base station need to be handed over from the source base station to the target base station. As shown in FIG. 12, the network side device 1200 includes:

a receiver 1203, configured to receive a bearer handover message; and a processor 1201, configured to determine, according to the bearer handover message, a bearer needing to be handed over in all the bearers, so that an end marker End Marker message is sent to the source base station only for the bearer needing to be handed over.

In this embodiment, the processor 1201 can complete all functions of the processing unit in Embodiment 1 or perform same steps; the receiver 1203 can complete all functions of the receiving unit in Embodiment 1 or perform same steps. A connection relationship between the processor and the receiver is consistent with a connection relationship between the processing unit and the receiving unit in Embodiment 1. This embodiment is an apparatus embodiment similar to Embodiment 1, and can implement an effect similar to that of Embodiment 1, and details are not described again.

By using the foregoing solution, for a multi-connection scenario, a network side device can determine a bearer needing to be handed over, so that an end marker message is sent only for the bearer needing to be handed over, which can prevent discarding of subsequent data of a bearer that is not to be handed over, and ensure multiple connections between a UE and base stations, thereby improving stability of a system.

Embodiment 10

A technical solution in which a network side device is an SGW is described in this embodiment.

Figure 13:
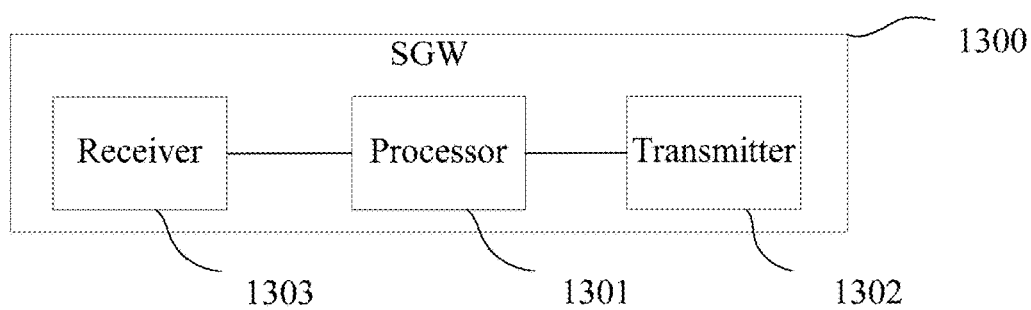
FIG. 13 is a block diagram of an SGW according to Embodiment 10 of the present invention.

As shown in FIG. 13, the SGW 1300 may include: a receiver 1303, configured to receive at least one bearer modification request message sent by a mobility management entity MME, where bearer contexts included in the at least one bearer modification request message correspond to all bearers;

a processor 1301, configured to determine, according to the bearer contexts in the at least one bearer modification request message, a bearer needing to be handed over; and a transmitter 1302, configured to send an End Marker message to a source base station only for the bearer needing to be handed over.

In this embodiment, the processor 1301 can complete all functions of the processing unit in Embodiment 2 or perform same steps; the receiver 1303 can complete all functions of the receiving unit in Embodiment 2 or perform same steps; the transmitter 1302 can complete all functions of the sending unit in Embodiment 2 or perform same steps. A connection relationship between the processor, the receiver, and the transmitter is consistent with a connection relationship between the processing unit, the receiving unit, and the sending unit in Embodiment 2. This embodiment is an apparatus embodiment similar to Embodiment 2, and can implement an effect similar to that of Embodiment 2, and details are not described again.

By using the foregoing solution, for a multi-connection scenario, an SGW can determine a bearer needing to be handed over, so that the SGW sends an end marker message only for the bearer needing to be handed over, which can prevent discarding of subsequent data of a bearer that is not to be handed over, and ensure multiple connections between a UE and base stations, thereby improving stability of a system.

Embodiment 11

A technical solution in which a network side device is an MME is described in this embodiment.

Figure 14:
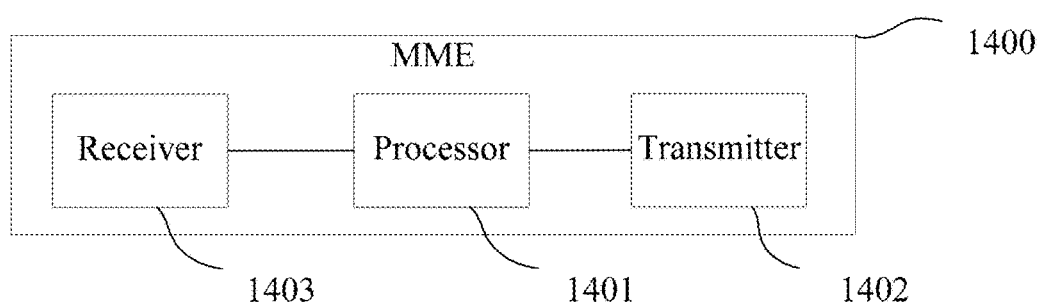
FIG. 14 is a block diagram of an MME according to Embodiment 11 of the present invention.

As shown in FIG. 14, the MME 1400 may include:

a receiver 1403, configured to receive an E-RAB modification indication message sent by a source base station, where bearer contexts included in the E-RAB modification indication message correspond to all bearers; and a processor 1401, configured to determine, according to the bearer contexts in the E-RAB modification indication message, a bearer needing to be handed over; and a transmitter 1402, configured to send a bearer modification request message to an SGW, where a bearer context carried in the bearer modification request message includes only a bearer context of the bearer needing to be handed over.

In this embodiment, the processor 1401 can complete all functions of the processing unit in Embodiment 3 or perform same steps; the receiver 1403 can complete all functions of the receiving unit in Embodiment 3 or perform same steps; the transmitter 1402 can complete all functions of the sending unit in Embodiment 3 or perform same steps. A connection relationship between the processor, the receiver, and the transmitter is consistent with a connection relationship between the processing unit, the receiving unit, and the sending unit in Embodiment 3. This embodiment is an apparatus embodiment similar to Embodiment 3, and can implement an effect similar to that of Embodiment 3, and details are not described again.

By using the foregoing solution, for a multi-connection scenario, an MME may determine a bearer needing to be handed over, so that an SGW may send an end marker message only for the bearer needing to be handed over, which can prevent discarding of subsequent data of a bearer that is not to be handed over, and ensure multiple connections between a UE and base stations, thereby improving stability of a system.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The present invention is described in detail with reference to the accompany drawings and in combination with the exemplary embodiments, but the present invention is not limited thereto. Various equivalent modifications or replacements can be made to the embodiments of the present invention by a person of ordinary skill in the art without departing from the essence of the present invention, and the modifications or replacements shall fall within the scope of the present invention.

What is claimed is:

1. A network side device, configured to control a bearer handover, wherein the network side device belongs to a wireless communications system, wherein the system further comprises a source base station and a target base station, and at least some of all bearers between user equipment and the source base station need to be handed over from the source base station to the target base station, and the network side device comprises:

a receiver, configured to receive at least one bearer modification request message sent from a mobility management entity (MME), bearer contexts comprised in the at least one bearer modification request message correspond to all the bearers;

a processor, configured to determine, according to the bearer contexts in the at least one bearer modification request message, a bearer needing to be handed over in all the bearers; and a transmitter, configured to send an end marker message to the source base station only for the bearer needing to be handed over;

wherein the network side device is a serving gateway (SGW); and wherein the processor configured to determine according to the bearer contexts in the at least one bearer modification request message, the bearer needing to be handed over in all the bearers, comprises:

the processor is configured to match fully qualified tunnel endpoint identifiers (F-TEIDs) in the bearer contexts in the at least one bearer modification request message with F-TEIDs in bearer contexts that are currently stored by the SGW, and when an F-TEID of a bearer is changed, determine that the bearer is a bearer needing to be handed over.

2. The network side device according to claim 1, wherein the processor is further configured to reserve a context of a bearer that does not need to be handed over.

3. A bearer handover control method, wherein the method is applicable to a wireless communications system, wherein the system comprises a network side device, a source base station, and a target base station, and at least some of all bearers between user equipment and the source base station need to be handed over from the source base station to the target base station, the network side device is a serving gateway (SGW), and the method comprises following steps:
  receiving, by the network side device, a bearer handover message, comprising: receiving, by the SGW, at least one bearer modification request message sent by a mobility management entity (MME), wherein bearer contexts comprised in the at least one bearer modification request message correspond to all the bearers;
  determining, by the network side device according to the bearer handover message, a bearer needing to be handed over in all the bearers, comprising: determining, by the SGW according to the bearer contexts in the at least one bearer modification request message, the bearer needing to be handed over; and
  sending, by the network side device, an end marker message to the source base station only for the bearer needing to be handed over;
  wherein the determining, by the SGW according to the bearer contexts in the at least one bearer modification request message, the bearer needing to be handed over comprises:
    matching, by the SGW, fully qualified tunnel endpoint identifiers (F-TEIDs) in the bearer contexts in the at least one bearer modification request message with F-TEIDs in bearer contexts that are currently stored by the SGW, and when an F-TEID of a bearer is changed, determining that the bearer is a bearer needing to be handed over.

4. The control method according to claim 3, further comprising: reserving, by the SGW, a context of a bearer that does not need to be handed over.

5. A non-transitory computer-readable storage medium storing a program to be executed by at least one processor, the program including instructions to configure the at least one processor for:
  receiving at least one bearer modification request message sent from a mobility management entity (MME), bearer contexts comprised in the at least one bearer modification request message correspond to all the bearers;
  determining according to the bearer contexts in the at least one bearer modification request message, a bearer needing to be handed over in all the bearers; and
  sending an end marker message to the source base station only for the bearer needing to be handed over;
  wherein the determining according to the bearer contexts in the at least one bearer modification request message, the bearer needing to be handed over comprises:
    matching fully qualified tunnel endpoint identifiers (F-TEIDs) in the bearer contexts in the at least one bearer modification request message with F-TEIDs in bearer contexts that are currently stored in a SGW, and when an F-TEID of a bearer is changed, determining that the bearer is a bearer needing to be handed over.

* * * * *